United States Patent [19]

Richardson et al.

[11] 4,005,917
[45] Feb. 1, 1977

[54] PILLOW BLOCK AND APPARATUS FOR MAKING SAME

[75] Inventors: Ralph G. Richardson; William J. Vitron, both of Fairview, Pa.

[73] Assignee: Hoover Ball and Bearing Company, Saline, Mich.

[22] Filed: Oct. 22, 1975

[21] Appl. No.: 624,917

[52] U.S. Cl. .................................. 308/72; 308/74; 308/238
[51] Int. Cl.² .......................................... F16C 9/06
[58] Field of Search ...................... 308/72, 74, 238

[56] References Cited
UNITED STATES PATENTS 3,934,953  1/1976  Tooky ............................. 308/72

Primary Examiner—Joseph F. Peters, Jr.
Assistant Examiner—Gene A. Church
Attorney, Agent, or Firm—Olsen and Stephenson

[57] ABSTRACT

A pillow block for mounting a bearing having an outer spherical surface, the pillow block including a molded one-piece rigid foam body member with a bearing seat in which the spherical surface of the bearing can be supported. Mold apparatus is disclosed for molding the pillow block in modified forms in each of which the bearing seat has a construction preventing axial displacement of the bearing when mounted in the pillow block.

7 Claims, 14 Drawing Figures

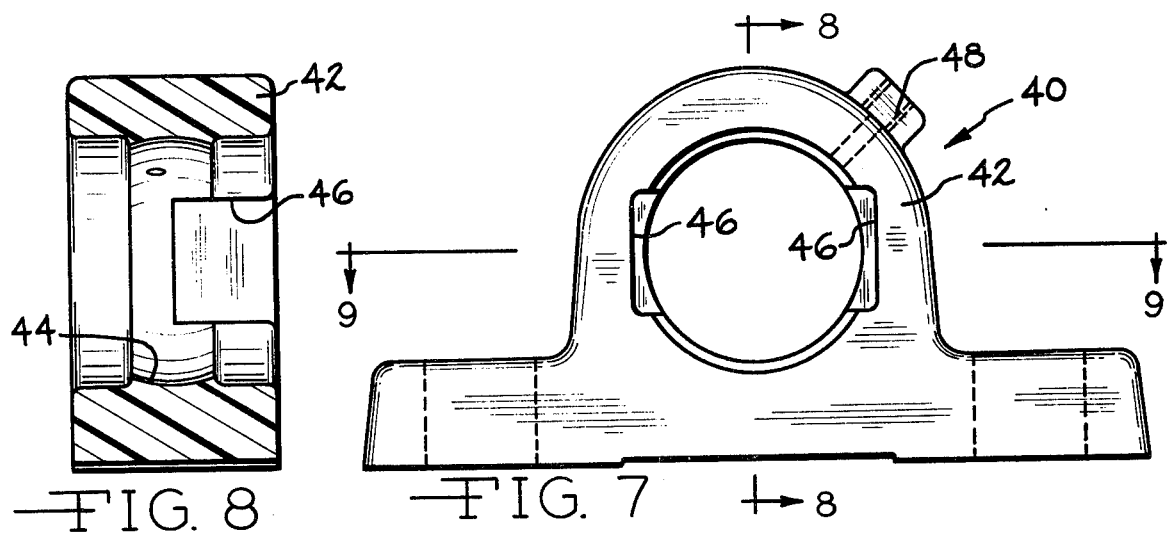
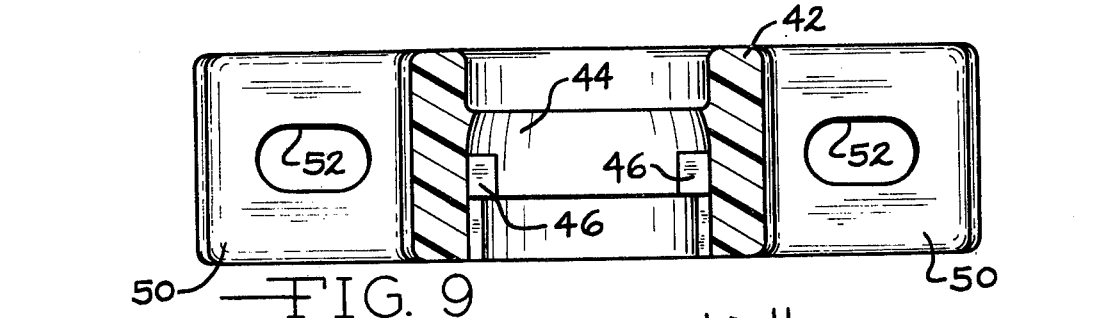
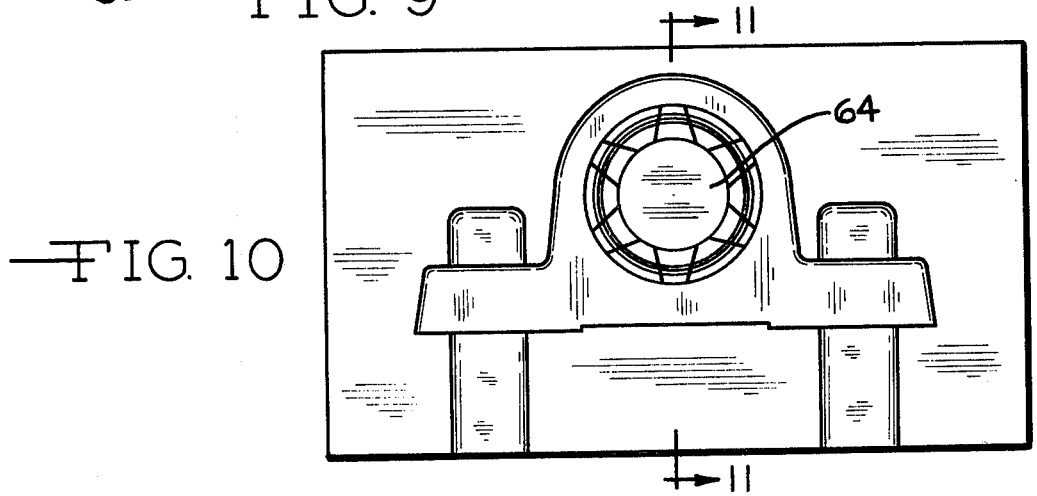
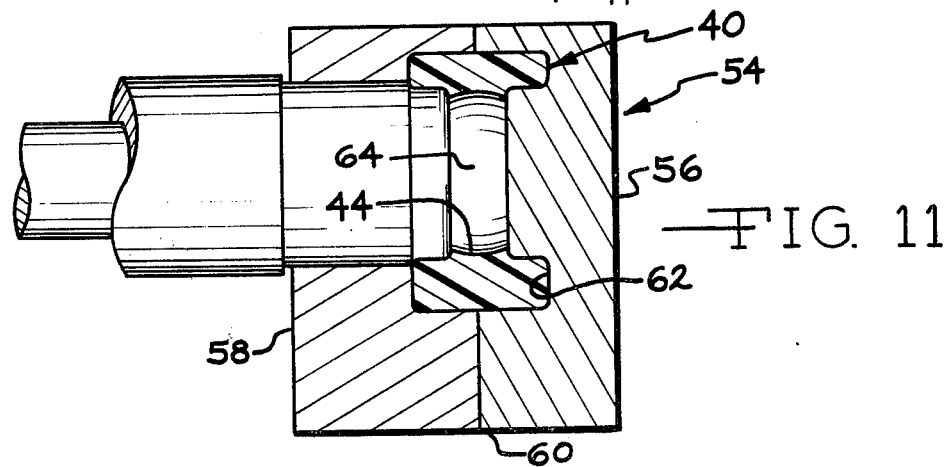

U.S. Patent  Feb. 1, 1977  Sheet 3 of 3  4,005,917
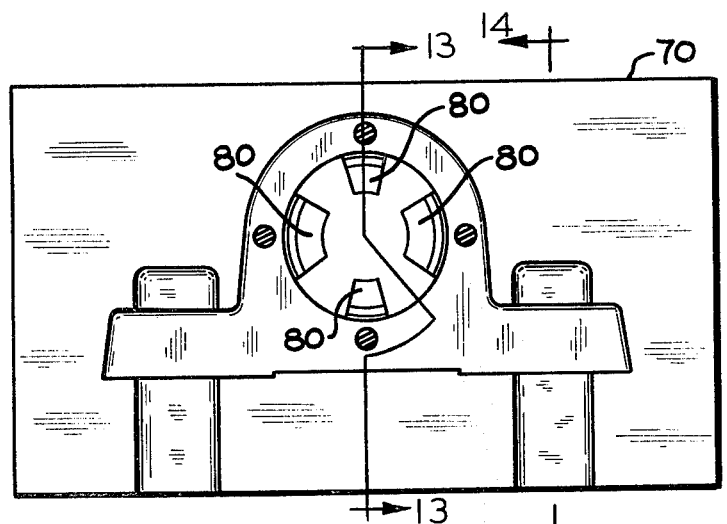
FIG. 12
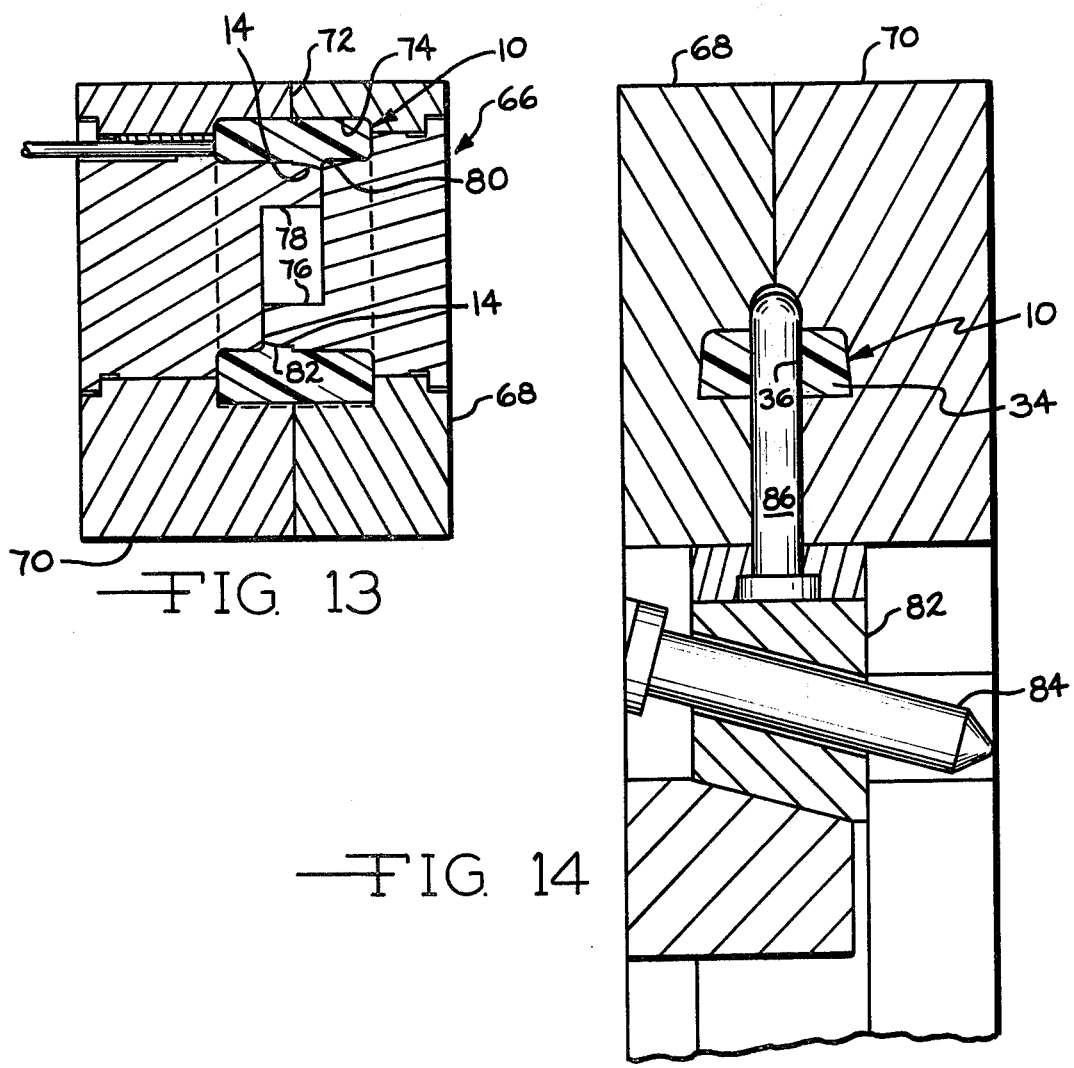
FIG. 13
FIG. 14

PILLOW BLOCK AND APPARATUS FOR MAKING SAME

BACKGROUND OF THE INVENTION

The present invention relates to improvements in pillow blocks of the type used for supporting a shaft bearing or the like, and particularly to a pillow block in which a ball bearing can be mounted so that its outer race is retained against axial and radial displacement.

It is conventional practice to provide a pillow block with a spherical socket or bearing seat in which the outer race of a ball bearing can be inserted and retained. One of the common practices utilized for inserting the bearing into the socket or seat is to provide diametrically opposite notches in one end of the seat through which the bearing can be introduced when its axis is held at right angles to the axis of the seat, and when fully inserted the bearing can be turned with its axis coincident with that of the seat.

Pillow blocks of the foregoing character are generally manufactured of metal and are relatively costly, because of the manufacturing procedures that are followed for producing and finishing the socket or seat for the bearing. Efforts have been made to overcome some of the problems relating to pillow block manufacture and to cost reduction by producing bearing blocks from plastic materials, such as is disclosed, for example, in U.S. Pat. No. 3,439,964 wherein a flexible bearing seat is utilized. However, these efforts have failed to provide a desired pillow block which has relatively low material and manufacturing costs and which has low weight and desirable physical properties.

SUMMARY OF THE INVENTION

The present invention has provided an improved pillow block that overcomes the inadequacies of the prior art, and it further provides apparatus for manufacturing the improved pillow block. The pillow block is made by molding operations that eliminate the need for machining the bearing seat, and preferably, the molding operation employs conventional thermoplastic structural foam materials.

According to one form of the present invention, a pillow block is provided for supporting a bearing which has a generally spherical shaped outer wall, the pillow block comprising a one-piece rigid foam plastic body member defining a socket or bearing seat of a generally spherical shape for receiving the outer wall of the bearing and retaining the bearing against radial and axial displacement. The bearing seat has a first series of circumferentially spaced intermittent spherical segments facing in one axial direction and a second series of circumferentially spaced intermittent spherical segments facing in the other axial direction, the segments of the first and second series being out of phase with one another, and one of the series has two diametrically opposite entry slots for receiving a bearing that is to be introduced into the bearing seat. The body member is formed of a rigid foam plastic material so that it is light in weight and relatively low in cost. Further, the socket or bearing seat is formed with two series of circumferentially spaced intermittent spherical segments so that the pillow block can be manufactured in a simple and economical manner wherein the block is formed by a molding operation and the molds can readily define the contours of the pillow block without the need for using core elements or the like when molding the socket or bearing seat. By virtue of the construction and arrangement of the pillow block, the required draft can be provided on all surfaces of the two mold halves that are used in making the pillow block so that the two halves can readily be pulled apart for discharging the molded product.

The present invention also includes the mold apparatus for forming the pillow block as a one-piece rigid body member. The apparatus comprises first and second mold halves defining between them a parting line and a cavity located on both sides of the parting line conforming to the configuration of the pillow block. The mold halves have central projecting portions cooperating to define the socket or bearing seat of the pillow block on which the spherical shape outer wall of the bearing can be supported. Each of the central projecting portions extend beyond the parting line and include a series of circumferentially spaced intermittent spherical segments located by only on the remote side of the parting line to permit separation of the molds after a pillow block has been molded thereon. The series of circumferentially spaced intermittent spherical segments of one mold half are out of phase with the circumferentially spaced intermittent spherical segments of the other mold half so that the extremities of each set of segments can penetrate the spaces between the other set of segments when the mold halves are closed.

Thus, it is an object of the present invention to provide an improved pillow block for supporting a bearing, and to provide improved mold apparatus for manufacturing the pillow block.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 7 is a front elevational view of another form of a pillow block embodying the present invention;

FIG. 8 is a vertical section taken on the line 8—8 of FIG. 7;

FIG. 9 is a horizontal section taken on line 9—9 of FIG. 7;

FIG. 10 is a front elevational view of one half of the mold for forming the pillow block shown in FIG. 7;

FIG. 11 is a sectional view taken on the line 11—11 of FIG. 10;

FIG. 12 is a front elevational view of one of the mold halves used in forming the pillow block illustrated in FIG. 1;

FIG. 13 is a sectional view taken on the line 13—13 of FIG. 12; and

FIG. 14 is an enlarged section taken on the line 14—14 of FIG. 12.

DESCRIPTION OF THE PREFERRED EMBODIMENTS

Figure 1:
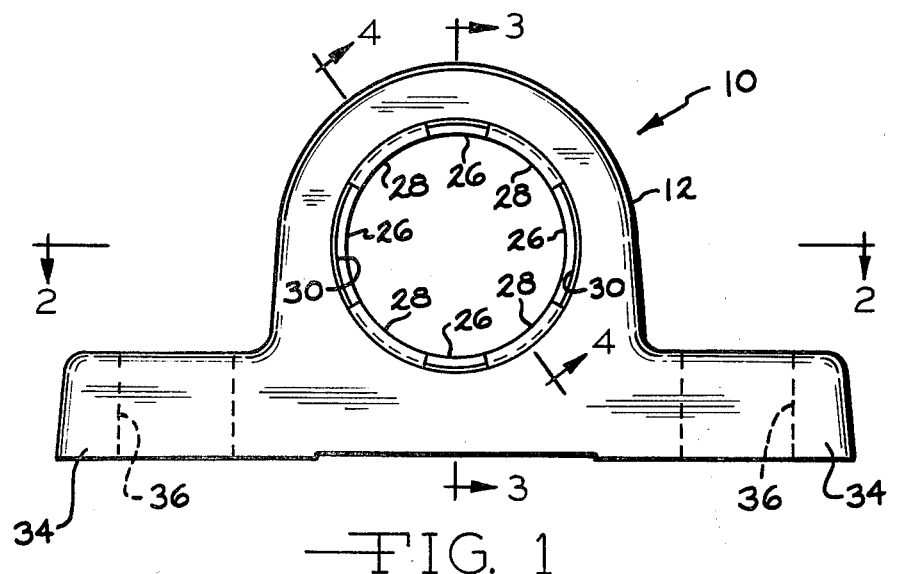
FIG. 1 is a front elevational view of one form of a pillow block embodying the present invention.
Figure 2:
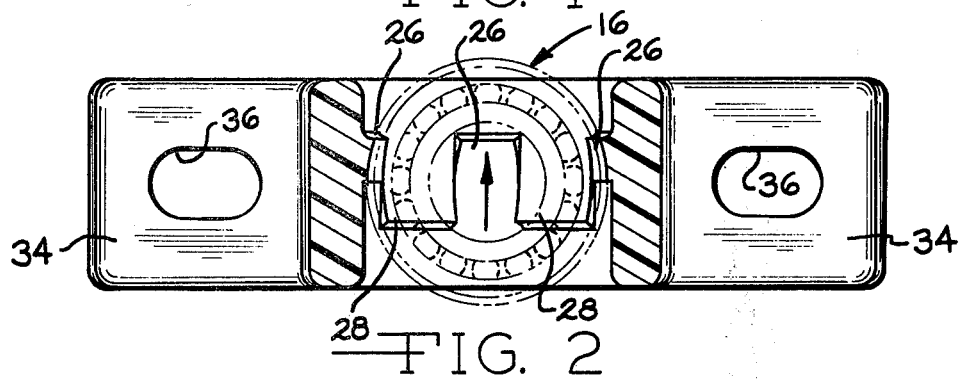
FIG. 2 is a section taken on the line 2—2 of FIG. 1 and showing in broken lines a bearing in one stage of being introduced into the bearing seat of the pillow block.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the invention will be described in greater detail. Attention is directed first to FIGS. 1-4 for a description of the embodiment of the pillow block illustrated therein. The pillow block 10 comprises a one-piece rigid foam plastic body member 12 having a socket or bearing seat 14 of a generally spherical shape for receiving the outer wall of a bearing that is to be mounted and retained therein. The pillow block 10 is particularly adapted for use in conjunction with a roller bearing 16 of the type illustrated in broken lines in FIG. 2 and 3. As can be seen in these Figures, the roller bearing 16 is a conventional unit having an inner race 18, an outer race 20, and a plurality of balls 22 retained there between. The outer race 20 has a truncated spherical outer wall 24. The truncated spherical outer wall 24 is adapted to be seated in the bearing seat 14 to be retained therein against axial and radial displacement.

Figure 3:
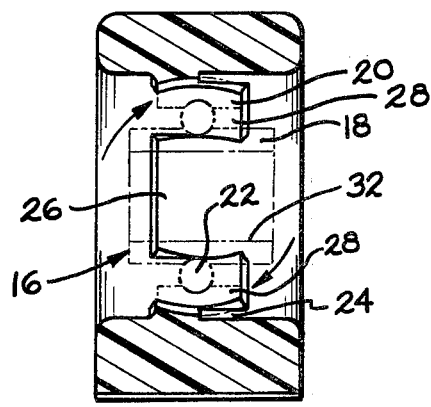
FIG. 3 is a section taken on the line 3—3 of FIG. 1 and showing in broken lines the bearing in its mounted position in the bearing seat.
Figure 4:
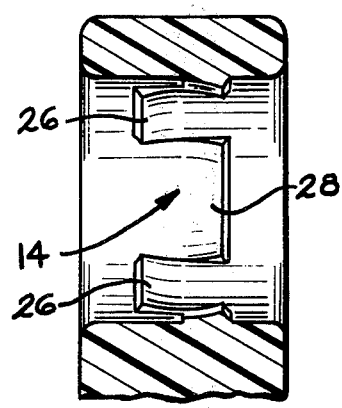
FIG. 4 is a fragmentary section taken on the line 4—4 of FIG. 1.

The bearing seat 14 has a first series of circumferentially spaced intermittent spherical segments 26 facing in one axial direction, and a second series of circumferentially spaced intermittent spherical segments 28 facing in the other axial direction. The segments 26 are out of phase with the segments 28 for manufacturing purposes, which will subsequently be described. The spacing of the segments is such that the one series provides two diametrically opposite entry slots for receiving the bearing 16 when the latter is introduced through the entry slots 30 in the position shown in FIG. 2. As there shown, the bearing is inserted in an endwise position with its axis perpendicular to the axis of the bearing seat 14. Once the bearing 16 have been fully inserted it can then be pivoted about a horizontal axis, as shown in FIG. 3 to a position wherein its outer wall 14 is seated on the bearing seat 14. Thereafter, a shaft can be inserted through the ball 32 of the bearing. When mounted in this fashion, the segments 26 and 28 will prevent axial and radial displacement of the bearing with respect to the pillow block 10.

Figure 5:
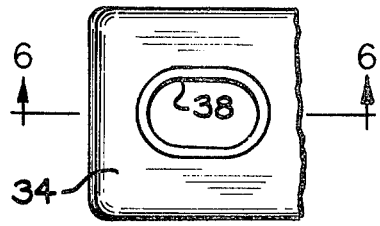
FIG. 5 is a fragmentary top plan view showing a modified form of the slot in the pillow block for mounting the latter on a supporting surface.
Figure 6:
FIG. 6 is a fragmentary section taken on the line 6—6 of FIG. 5.

In the conventional manner, the body member 12 has laterally projecting mounting portions 34 with slots 36 extending therethrough for mounting the pillow block 10 on a supporting surface. In some instances it may be desired to have a stronger material in slots 36 than the rigid foam plastic material used in manufacturing the pillow block 10, and for this purpose the metallic liners 38 may be molded directly in the slots 36 as is shown in FIGS. 5 and 6.

Attention is next directed to FIGS. 7, 8 and 9 wherein a pillow block 40 is shown embodying another form of the present invention. The pillow block 40 also includes a body member 42 that is formed of a one-piece rigid foam plastic body member that has a socket or bearing seat 44 of a generally spherical shape for receiving a bearing having a truncated spherical outer wall and for retaining the bearing against radial and axial displacement. In this embodiment of the invention the bearing seat 44 has diametrically opposite entry slots 46 for receiving a bearing when introduced endwise into the bearing seat 44 in the conventional manner previously described. If desired, a conventional lubricating fitting 48 can be molded into the body member 42. This embodiment of the invention is constructed similar to that previously described and has laterally projecting mounting portions 50 through which slots 52 have been molded for securing the pillow block 40 to a supporting surface. If desired, this embodiment of the invention can also utilize metallic inserts within the slots 52 similar to those shown in FIGS. 5 and 6.

Attention is next directed to FIGS. 10 and 11 for a description of molding apparatus that can be utilized for manufacturing the pillow block illustrated in FIGS. 7, 8 and 9. The mold apparatus 54 includes the first mold half 56 and the second mold half 58 which define between them a parting line 60 and a cavity 62 which conforms to the configuration of the pillow block 40. A conventional collapsible core mechanism 64 extends through the mold half 58 and when in the expanded position shown in FIG. 11 provides a core surface for defining the spherical shaped socket or bearing seat 44. When the mold halves 56 and 58 are to be parted to permit removal of the pillow block 40, the conventional collapsible core mechanism 64 will be collapsed to permit removal therefrom of the pillow block 40. When molding the pillow block 40, a conventional injection molding machine will be employed with the mold apparatus 54. With the mold apparatus in the closed position, plastic material will be injected through a nozzle into the mold cavity via a port, not shown, and thereafter, time will be allowed for the plastic to foam and then cure. Then, the molding machine will be moved to the open position and the molded part will be ejected. When forming products such as the pillow block 40, special tooling is required in the nature of the collapsible core mechanism 64 because of the configuration of the bearing seat 44 in the finished product. The improved molding apparatus illustrated in FIGS. 12, 13 and 14 has eliminated the need for tooling equipment such as the collapsible core mechanism 64, and this improved apparatus is used to produce the improved pillow block 10.

Referring now to FIGS. 12, 13 and 14, the mold apparatus 66 includes the first mold half 68 and the second mold half 70 which define between them a parting line 72 and a cavity 74 located on opposite sides of the parting line and conforming to the configuration of the pillow block 10. The mold half 68 has a central projecting portion 76 and the mold half 70 has a similar central projection portion 78 which cooperate to define the bearing seat 14 of the pillow block 10 on which the bearing 16 can be supported. Each of the central projecting portions 76 and 78 extend beyond the parting line 72 and include a series of circularly spaced intermittent spherical segments 80 and 82 located only on the remote side of the parting line so that they have proper draft to permit separation of the mold halves 68 and 70 after a pillow block has been molded therein. The series of circularly spaced intermittent spherical segments 80 of the one mold half are out of phase with the circularly spaced intermittent spherical segments 82 of the other mold half so that the extremities of each set of segments can penetrate the spaces between the other set of segments when the mold halves are closed. Thus, a complete inner wall within the pillow block is defined and portions of the wall are in the form of spherical shaped segments for defining the bearing seat 14.

In this form of the invention a conventional injection molding machine can be employed for injecting foam plastic material into the mold cavities in the manner previously described.

With particular reference to FIG. 14, the apparatus for forming the slots 36 or 52 in the two embodiments of the present invention described will now be explained, with particular reference to the mold apparatus shown in FIGS. 12, 13 and 14. In the apparatus shown in FIG. 14, the mold half 70 normally is movable horizontally relative to the mold half 68 for the purpose of opening and closing the mold. As an incident to opening the mold half 70, the slide 82 is caused to move inward on the stationary shaft 84 so as to move the core pin 86 downward and out of the slot 36 in the molded pillow block 10. Similarly, when the mold half 70 is moved to a closed position, the slide 82 will travel on the shaft 84 to again advance the core pin 86 to the uppermost position shown in FIG. 14 so that when the pillow block 10 is molded it will have the slot 36 formed therein. The apparatus for actuating the core pin 86 can be used with the mold apparatus illustrated and described in connection with FIGS. 10 and 11 as well as the apparatus disclosed and described in connection with FIGS. 12, 13 and 14. This apparatus is known in the art and is not by itself a separate invention.

It is claimed:

1. A pillow block for supporting a bearing which has an outer race with a truncated spherical outer wall, said pillow block comprising a onepiece rigid foam plastic body member having a bearing seat of a generally spherical shape for receiving the outer wall of said bearing and for retaining the bearing against radial and axial displacement, said bearing seat having a first series of intermittent spherical segments facing in one axial direction and a second series of intermittent spherical segments facing in the other axial direction, the segments of the first and second series being out of phase with one another.

2. The pillow block that is defined in claim 1, wherein said bearing seat has two diametrically opposite entry slots for receiving a bearing, said seat extending in one axial direction through one of the series of spherical segments.

3. The pillow block that is defined in claim 1, wherein said body member has laterally projecting mounting portions with slots therethrough for securing the pillow block to a supporting surface.

4. The pillow block that is defined in claim 3, wherein metallic liners are molded in said body member to provide metallic walls for said slots.

5. A pillow block for supporting a bearing which has an outer race with a truncated spherical outer wall, said pillow block comprising a one-piece rigid foam plastic body member having a bearing seat of a generally spherical shape for receiving the outer wall of said bearing and for retaining the bearing against radial and axial displacement, said bearing seat having diametrically opposite entry slots extending in one axial direction inward to the axial midsection of the bearing seat through which a bearing can be inserted endwise for subsequent pivoting within said inner wall to a position coaxial of said bearing seat defined by said inner wall.

6. A pillow block for supporting a bearing which has a generally spherical shaped outer wall, said pillow block comprising a one-piece rigid body member defining a bearing seat of a generally spherical shape for receiving the outer wall of said bearing and for retaining the bearing against radial and axial displacement, said bearing seat having a first series of circumferentially spaced intermittent spherical segments facing in one axial direction and a second series of circumferentially spaced intermittent spherical segments facing in the other axial direction, the segments of said first and second series being out of phase with one another, one of said series having two diametrically opposite entry slots for receiving a bearing that is to be introduced into said bearing seat.

7. The pillow block that is defined in claim 6, wherein said body member is a rigid foam plastic material.

* * * * *